N. W. McLEOD.
APPARATUS FOR FORMING AND VULCANIZING RUBBER ARTICLES.
APPLICATION FILED AUG. 2, 1913.
1,118,504.
Patented Nov. 24, 1914.
2 SHEETS—SHEET 1.
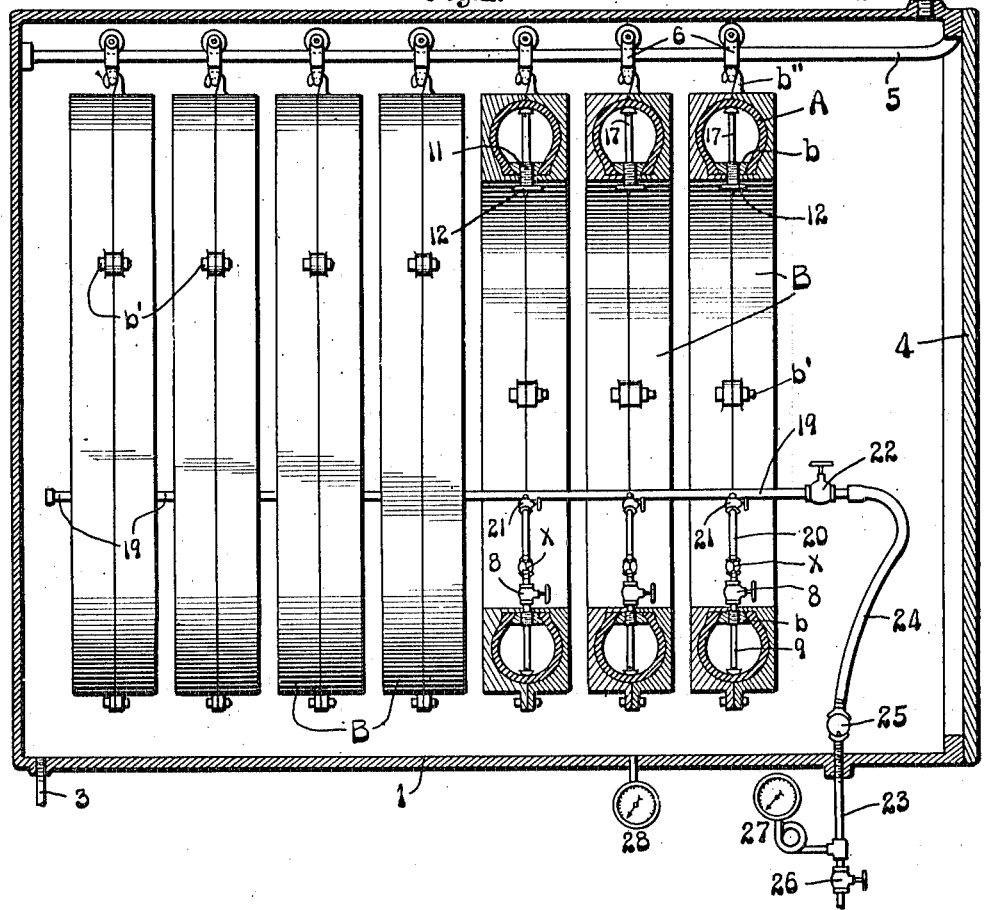
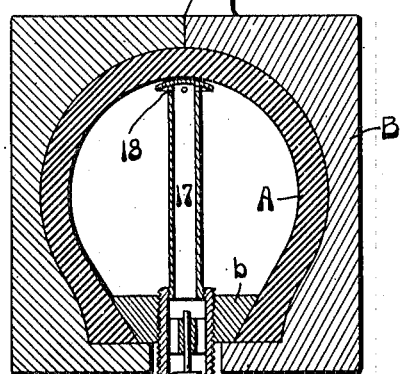
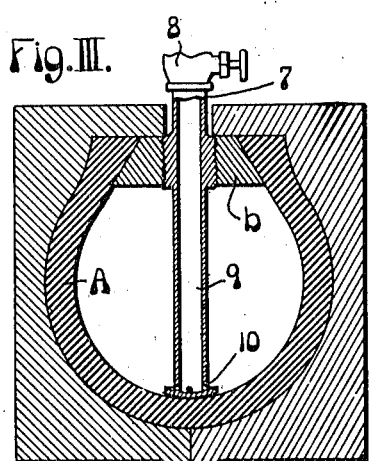

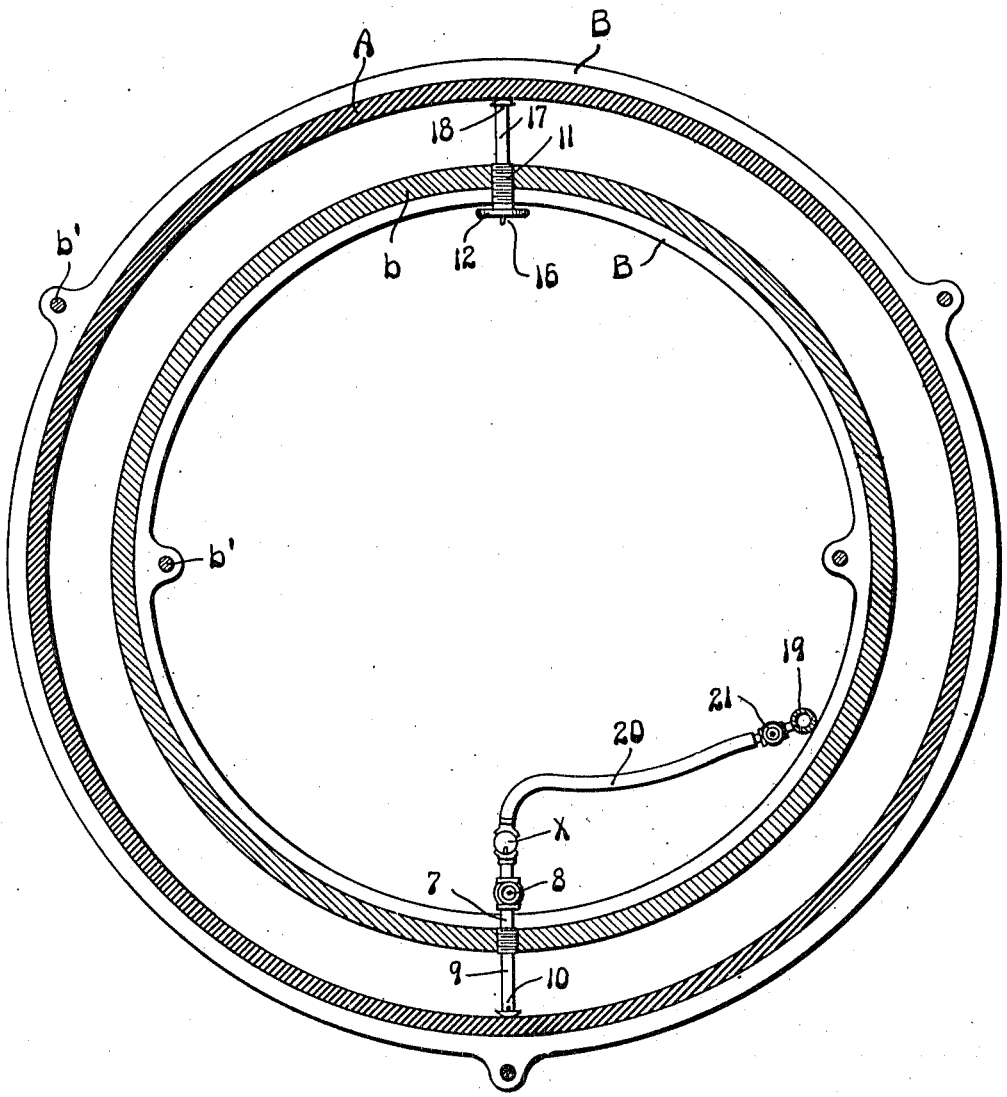

UNITED STATES PATENT OFFICE.

NELSON W. McLEOD, OF ST. LOUIS, MISSOURI, ASSIGNOR TO THE AMERICAN TIRE COMPANY, OF ST. LOUIS, MISSOURI, A CORPORATION.

APPARATUS FOR FORMING AND VULCANIZING RUBBER ARTICLES.

1,118,504.   Specification of Letters Patent.   Patented Nov. 24, 1914.

Application filed August 2, 1913. Serial No. 782,624.

*To all whom it may concern:*

Be it known that I, NELSON W. McLEOD, a citizen of the United States of America, and a resident of the city of St. Louis and State of Missouri, have invented certain new and useful Improvements in Apparatus for Forming and Vulcanizing Rubber Articles, of which the following is a full, clear, and exact description, reference being had to the accompanying drawings, forming a part of this specification.

My invention relates to an apparatus for use in forming and vulcanizing rubber articles, the apparatus being designed more particularly for use in forming and vulcanizing hollow rubber tires, the structures of which comprise rubber compounds, and fabric for reinforcing the rubber compounds.

My invention relates more particularly to certain specific improvements in that construction of apparatus for forming and vulcanizing rubber articles which comprises a vulcanizer pot in which a mold may be confined and means for conducting fluid from and to the cavity of the mold while the latter is confined in the vulcanizer pot.

My improvement consists in combining in such a structure a series of movable molds and a manifold for conducting the fluid from and to the molds.

My improvements consists further in an improved construction of the fluid conductor connection consisting of a manifold provided with branch pipes having nozzles connecting the fluid conducting pipe with a series of molds.

My improvement consists further in an improved construction of nozzle for connecting the fluid conducting pipe with the mold cavity.

My improvement consists further in an improved construction of automatic valve device located between the cavity of the mold and the chamber of the vulcanizer pot.

Figure I is a vertical longitudinal section of my apparatus, some of the molds therein being shown in section and some in edge elevation. Fig. II is an enlarged cross section through one of the molds at the automatic valve device. Fig. III is an enlarged cross section through one of the molds at the water induction connection. Fig. IV is an enlarged view showing one section of the mold and the fluid conductors in elevation, and showing the mold abutment ring and the tire in section.

In the drawings: I have illustrated my apparatus in the preferred construction, with the article to be treated shown as a rubber tire, designated A, the tire having two edges at its inner circle and being built up of fabric and rubber compound, in accordance with the usual practice in making hollow tires of the pneumatic tire type. The tires A are incased within suitable sectional molds B, held assembled by bolts $b'$, or other suitable means, each mold including, in addition to shell sections, an abutment ring $b$, which is situated between the edges at the inner circle of the tire when the built up raw tire is placed within the mold, to remain in such position throughout the treatment of the tire. The abutment ring, by its position between the edges of the tire, permits of the tire edges being tightly clamped between said abutment ring and the shell sections of the mold to produce fluid tight joints, in order that fluids introduced into the tire occupying the mold cavity, may be retained therein for the treatment of the tire. Fluids are delivered into the tires by means which will be hereinafter fully described.

1 designates a vulcanizer pot, through which steam is circulated, the pot, with this object in view, having connected to it pipes 2 and 3, one of which serves to admit live steam to the pot, and the other of which allows the steam to escape from the pot. The vulcanizer pot has a closure 4, which may be held in closed position by any suitable means.

In my apparatus, I utilize a plurality of molds, such as those shown in the drawings, suspended in series in the vulcanizer pot 1; and to permit of such suspension of the molds, they are provided with suitable hangers, preferably in the form of hooks $b''$. The vulcanizer pot contains a track rail 5, extending longitudinally thereof, upon which are arranged travelers 6, adapted to receive the hangers $b''$ of the molds.

Each of the molds B utilized in my apparatus has attached thereto a pipe 7, which is arranged in the mold abutment ring $b$ in a manner to effect a fluid tight joint around said pipe, the pipe 7 being provided with a cut-off valve 8, and with one member of a suitable coupling X, preferably of the type used to connect air brake hose. The pipe 7 associated with each mold includes, or has connected to it, a nozzle 9, located within the hollow tire A confined in the mold, the said nozzle being closed at its end and being provided with apertures 10 in its wall adjacent to its closed end. Each mold used in my apparatus is also equipped with an automatic valve device providing communication between the interior of the tire in the mold and the exterior of the mold. This automatic valve device comprises a valve casing 11, so seated in the abutment ring of the mold as to effect a fluid tight joint, and being preferably provided with a hand wheel 12, or other suitable device by which the valve casing may be readily seated in and removed from said abutment ring. The valve casing 11 is provided at its outer end with a duct 13, and at the forward end of the chamber in said casing is a valve seat 14, which receives a check valve 15. The check valve 15 is carried by a stem 16, operable in a suitable guide provided therefor, whereby the valve is directed in its movement to and from the valve seat 14.

17 is a nozzle located within the mold and within the tire therein, this nozzle being connected at one end to the valve casing 11, being closed at its other end and having apertures 18 in its wall adjacent to its closed end.

19 designates a manifold adapted to be housed within the vulcanizer pot 1, the said manifold having connected to it a plurality of branch pipes 20 provided with cut off valves 21 and terminating in coupling members complementary to the coupling members carried by the pipes 7 extending into the tires within the molds B. The manifold 19 is adapted to extend longitudinally of the vulcanizer pot when arranged therein, and it is provided at one end with a cut off valve 22.

23 designates a drain pipe located exteriorly of the vulcanizer pot, and extending into said pot. The manifold 19 is placed in communication with the drain pipe 23 by a connecting pipe 24, suitably attached at one end to the manifold 19 and joined at its other end by a coupling 25 to the pipe 23, the said coupling providing for the ready attachment and deattachment of the connecting pipe in the use of the apparatus, as will hereinafter more fully appear. The drain pipe 23 is provided with a controlling valve 26, through the medium of which the flow of fluid in said pipe may be entirely shut off, or governed, as desired, at different times during the use of my apparatus.

A pressure gage 27 is attached to the drain pipe 23, between the controller valve 26 and the vulcanizer pot, this pressure gage providing for indication of the pressure in said pipe and in the members within the vulcanizer pot with which said drain pipe has communication when the apparatus is in service. A pressure gage 28 attached to the vulcanizer pot indicates steam pressure maintained in said pot.

In the practical use of my apparatus, the procedure is as follows: Raw and partially formed tires, produced in any preferred manner, are introduced in the molds B with the abutment rings b between the edges of the tires. Each of said abutment rings has applied thereto a pipe 7, and parts conjoined thereto, including a cut off valve 8, and one member of the coupling X, and also having applied to them the automatic valve device comprising the valve casing 11 and parts associated therewith. Before placing the molds containing the raw tires in the vulcanizer pot, I introduce water thereinto for the purpose of expanding or forcing the tires to the walls of the mold cavities. This introduction of water to the interiors of the tires is accomplished by attaching a water conducting pipe to the pipe 7 leading into the tire within the mold, and having the cut off valve 8 of said pipe 7 open to permit flow of water into and through the nozzle 9 extending into the incased tire. It may be remarked that air should be permitted to escape from the interior of the tire while the water is flowing thereinto, and such escape is readily accomplished by unseating the valve 15 of the automatic valve device manually, or by suitable means, the said valve being held open until all of the air has been exhausted from the tire. When water under pressure has been introduced into the molds in the manner described and the tires therein are subjected to water pressure to the desired degree so as to hold the tires against the walls of the mold cavities, the cut off valves 8 are closed, the water is confined within the tires, and the water conducting pipes are disconnected from the pipes 7. The molds having the tires therein filled with water, under pressure as explained, are then ready for introduction into the vulcanizer pot 1, and they are suspended one at a time within said vulcanizer pot by hanging them upon the travelers 6, the closure of the vulcanizer pot being, of course, at this time, open. When the first mold is suspended in the vulcanizer pot, the manifold 19 is connected to said mold by connecting the coupling X of pipe 7 of the mold and the branch pipe 20, farthest from the cut off valve 22 of the manifold to said first mold, the cut off valve 22 being at this time closed, and the valves 21 of the remaining branch pipes being also closed. The valve 21 of the branch pipe 20 connected to the first installed mold and valve 8 are then opened to provide communication between the interior of the first mold and the manifold 19, but inasmuch as the remaining valves 21 and the valve 22 are closed, the water entering the manifold 19 cannot escape therefrom. The entire set of molds to be used in my apparatus at one time are suspended in the vulcanizer pot and connected to the remaining branch pipes 20 in the same manner as that described with reference to the first mold, until finally the entire set of molds will be placed in communication with the manifold 19. The manifold 19 is then placed in communication with the drain pipe 23 through the medium of the connecting pipe 24 and the coupling 25, the controlling valve 26 of the pipe 23 being at this time closed. I then open the cut off valve 22 and close the vulcanizer pot by securing the closure 4 thereto, and the apparatus is in condition for the vulcanizing operation. The next step in the operation of my apparatus consists in the introduction of steam into the vulcanizer pot through the steam pipe 2 with escape of steam from the pot regulated by so controlling the passageway in the outlet pipe 3 as to result in the steam pressure in the vulcanizer pot being less than the pressure of the water within the molds B. The water in the molds is kept confined therein for a predetermined period until the molds have become heated by the steam in the vulcanizer pot, or until the raw tires therein have been heated to a limited degree, as an initial step in the vulcanization of the tire. It should be stated that, inasmuch as the water in the molds expands when heated, the controller valve 26 at the exterior of the vulcanizer pot should be opened slightly to maintain only the desired pressure in the molds, such pressure being indicated by the gage 27.

The use of the water in the molds is desirable only until the molds have become thoroughly heated and an initial step of vulcanization has been reached, after which the complete vulcanization is effected by the admission of steam to the interiors of the tires in the molds.

The admission of steam is effected by opening the controller valve 26 at the exterior of the vulcanizer pot and the water within the tires in the molds is permitted to escape gradually to and through the drain pipe 23, but more rapidly than before, from the molds through the branch pipes 20, the manifold 19 and pipe 24 to the drain pipe 23. While this withdrawal of water is taking place, the steam pressure within the vulcanizer pot is maintained, and as soon as the pressure within the tire confined in the molds has been reduced to a degree less than that of the steam in the vulcanizer pot, the steam acts to unseat the check valves 15. The steam then enters the tires and acts to force the water therefrom, replacing it as a pressure medium as rapidly as the water is discharged. The water, having been discharged from the tires in the molds, the controller valve 26 is closed, or partially closed, for the purpose of maintaining the desired steam pressure within the tires, which will be indicated by the pressure gage 27.

The presence of steam in the tires confined in the molds is then maintained simultaneously with the presence of steam in the vulcanizer pot for a sufficient period to completely vulcanize the tires, the vulcanization being effected by the heat of the steam present in and circulating through the tires and circulating around the molds in the vulcanizer pot.

I claim:—

1. A vulcanizing apparatus comprising a horizontally disposed vulcanizer pot, a horizontal track in said vulcanizer pot, a plurality of molds movably supported by said track, and means for draining said molds detachably connected thereto and extending to the exterior of said pot.

2. A vulcanizing apparatus comprising a horizontally disposed vulcanizer pot, a horizontal track in said vulcanizer pot, a plurality of molds movably supported by said track independently of each other, and means for draining said molds detachably connected thereto and extending to the exterior of said pot.

3. A vulcanizing apparatus comprising a horizontally disposed vulcanizer pot, a horizontal track in said vulcanizer pot by which a plurality of molds may be supported and adjusted in the pot, a manifold having communication with said molds, the said manifold being detachably connected to the molds, and a drain pipe located exteriorly of said vulcanizer pot with which said manifold communicates to permit of the draining of the contents of the mold to the exterior of said vulcanizer pot.

4. A vulcanizing apparatus comprising a horizontally disposed vulcanizer pot, a horizontal track in said pot, molds movable independently of each other on said horizontal track, valve devices carried by said molds providing communication between the interior and exterior of the molds, a manifold, branch pipes carried by said manifold detachably connected to said valve devices, and a drain pipe at the exterior of said vulcanizer pot with which said manifold communicates to permit the draining of said molds to the exterior of the vulcanizer pot.

5. A vulcanizing apparatus comprising a horizontally disposed vulcanizer pot, a horizontal track in said pot, molds movable independently of each other on said horizontal track, valve devices carried by said molds providing communication between the interior and exterior of the molds, a manifold, branch pipes carried by said manifold detachably connected to said valve devices, valves in said branch pipes, and a drain pipe at the exterior of said vulcanizer pot with which said manifold communicates to permit the draining of said molds to the exterior of the vulcanizer pot.

6. An apparatus for forming and vulcanizing rubber articles, comprising a vulcanizer pot, a track within said vulcanizer pot, a series of travelers arranged on said track, a series of molds supported by said travelers, a manifold having fluid conducting members adapted to be placed in communication with the interiors of said molds in succession, a valve in said manifold for preventing flow of fluid therethrough while said molds are being connected to said manifold, a drain pipe at the exterior of said vulcanizer pot, and a connection between said manifold and said drain pipe through which communication is established between the manifold and the drain pipe upon the opening of said valve.

NELSON W. McLEOD.

In the presence of—
  E. B. LINN,
  E. CLARK.